United States Patent [19]

Tuccio et al.

[11] Patent Number: 4,461,686
[45] Date of Patent: Jul. 24, 1984

[54] SEQUENTIAL MULTIPHOTON EXCITATION METHOD

[75] Inventors: Sam A. Tuccio, Cupertino, Calif.; Donald F. Heller, Convent Station, N.J.

[73] Assignee: Allied Corporation, Morris Township, Morris County, N.J.

[21] Appl. No.: 327,148

[22] Filed: Dec. 3, 1981

[51] Int. Cl.³ .............................................. B01D 59/00
[52] U.S. Cl. ......................... 204/157.1 R; 204/158 R; 423/3
[58] Field of Search .................... 423/3; 204/157.1 L, 204/157.1 R, 157.1 H, 158

[56] References Cited

U.S. PATENT DOCUMENTS

| | | | |
|---|---|---|---|
| 4,025,790 | 5/1977 | Jetto et al. | 250/284 |
| 4,049,515 | 9/1977 | Robinson et al. | 204/157.1 R |
| 4,107,536 | 8/1978 | St. Peters | 250/423 P |
| 4,110,182 | 8/1978 | Stevens | 204/157.1 R |
| 4,302,305 | 11/1981 | Kaldor et al. | 204/157.1 R |
| 4,334,883 | 6/1982 | Robinson et al. | 204/157.1 R |
| 4,350,577 | 9/1982 | Heller | 204/157.1 R |

Primary Examiner—Deborah L. Kyle
Attorney, Agent, or Firm—James Riesenfeld; Gerhard H. Fuchs

[57] ABSTRACT

Efficient multiphoton excitation is accomplished by sequentially exciting a polyatomic molecule with one or more wavelengths of infrared laser radiation. Preferably, the delay between successive excitations is longer than the rotational but shorter than the vibrational relaxation time of the molecule. By this method, laser-induced chemical reactions or isotope separation can be achieved with lower fluence and/or higher concentration of molecules than with prior art methods.

10 Claims, 9 Drawing Figures

SEQUENTIAL MULTIPHOTON EXCITATION METHOD

DESCRIPTION

Background of the Invention

1. Field of the Invention

This invention relates to multiphoton excitation of reactions in polyatomic molecules, more particularly to an excitation method effected by sequential infrared laser pulses.

2. Description of the Prior Art

Among the advances in photochemistry made possible by the laser is "multiphoton excitation" (MPE), which refers to the excitation of a polyatomic molecule by a large number of photons—generally infrared—of the same energy. In absorbing photons, the molecule is excited up the ladder of vibrational levels to a highly excited vibrational state. Since the energy separations between adjacent vibrational levels are not equal, a series of photons of different energies corresponding to the successive level separations would appear to be necessary. However, in intense IR laser fields, a very large number of IR photons all having the same energy may be absorbed by a polyatomic molecule, leading to collisionless photodissociation or predissociation or to other chemical reactions.

MPE using an infrared laser has been discussed extensively in the scientific literature (see, e.g., A. F. Sudbo et al., J. Chem. Phys. 69, 2312 (1978) and R. V. Ambartzumian et al., in *Chemical and Biochemical Applications of Lasers, Vol. III,* edited by C. B. Moore (Academic Press, New York, 1977)) and has been used as an isotope separation method (see, e.g., U.S. Pat. No. 4,049,515, issued Sept. 20, 1977, to Robinson et al., and U.S. Pat. No. 3,937,956, issued Feb. 10, 1976, to Lyon).

A disadvantage of prior art MPE is the high fluence (product of intensity and time) required for excitation. This high fluence threshold, generally greater than about 10 J/cm$^2$, requires the use of costly, high-power, low repetition-rate infrared lasers. High fluence requirements also limit operating pressure, since for fluence of 50 J/cm$^2$ or greater dielectric breakdown will generally occur unless pressure is below 1 kPa. Low operating pressure implies low production rate.

Heller et al. have reported a method for accessing the vibrational quasicontinuum of polyatomic molecules without the need for the high fluence required for MPE. Their method involves electronic photoexcitation and subsequent nonradiative relaxation (D. F. Heller et al., Chem. Phys. Lett. 69, 419 (1980)).

SUMMARY OF THE INVENTION

As used in this specification and the appended claims, the term "chemical reaction" is meant to include unimolecular reactions, such as isomerization, dissociation and predissociation, in addition to more conventional chemical reactions. By "sequential steps" we mean time-separated steps.

In accordance with the present invention, a multiphoton excitation method is provided, which comprises the sequential steps:

(a) exposing a gaseous material comprising polyatomic molecules to infrared laser radiation of a first predetermined wavelength to excite the polyatomic molecules to excited vibrational states of the ground electronic state and (b) exposing the material to infrared laser radiation of a second predetermined wavelength to further excite the molecules to produce a state at which the excited molecules undergo a chemical reaction.

Optimum results are achieved when the time delay between exposure to the first and second wavelength is shorter than the vibrational relaxation time but longer than the rotational relaxation time of the molecule.

Use of this invention can significantly increase the quantum yield of a wide variety of laser-induced processes, such as multiphoton dissociation, bimolecular reactions, pyrolysis, and laser-pumped lasers. As applied to laser isotope separation, an increase in enrichment factor can be obtained in addition to an increase in product yield. That application comprises the sequential steps of:

(a) exposing a gaseous material of polyatomic molecules comprising a particular isotope of an element and at least one other isotope of the same element to infrared laser radiation of a first predetermined wavelength to preferentially excite the polyatomic molecules containing the particular isotope of the element to excited vibrational states of the ground electronic state, (b) exposing the material to infrared laser radiation of a second predetermined wavelength whereby the excited molecules, enriched in the particular isotope, are further excited to produce a state at which the excited molecules undergo a chemical reaction, and (c) separating the resultant reaction product, enriched in the particular isotope, from the remainder of the material.

DETAILED DESCRIPTION OF THE INVENTION

Figure 1:
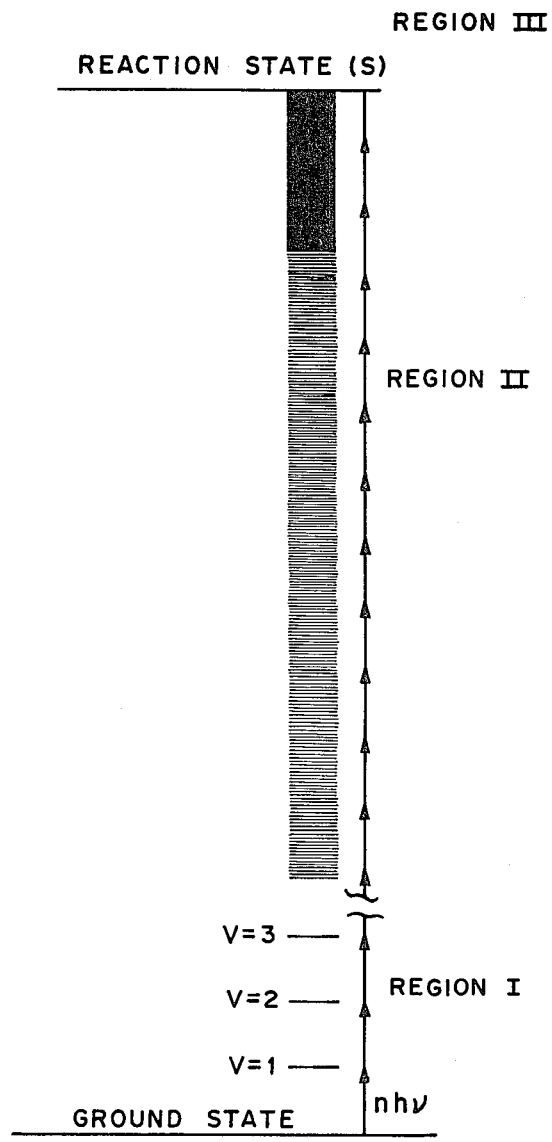
FIG. 1 shows a schematic energy level diagram and prior art MPE in a typical molecule used in the method of the present invention.

Conventional multiphoton excitation (MPE) of the prior art can be understood by referring to FIG. 1. Initially (in Region I) photon absorption proceeds by inducing transitions between discrete molecular vibrational levels. AC Stark broadening compensates for anharmonic effects which tend to push higher transitions out of resonance with the applied field. Operationally, the applied field must be nearly resonant with an infrared-active fundamental vibrational transition, typically $v=0$ to $v=1$. Above some threshold energy, which depends on the absorbing molecule, the photons can excite a quasicontinuum of molecular states (in Region II). The remainder of the up-pumping process proceeds efficiently (as if everywhere on resonance (and is relatively independent of photon energy. Up-pumping continues until a true continuum (Region III), or at least a denser quasicontinuum, is reached and electronic or chemical change competes effectivey with the absorption process.

The efficiency of the overall MPE process is limited by the number of molecules that can be excited past the rovibrational discrete state region (Region I), where anharmonic compensation is important, and through the vibrational quasi-continuum during the laser pulse. Unfortunately, for any thermal rotational distribution, optical selection rules ($J=0,\pm 1$) limit the number of molecules in which rotational excitation compensates for vibrational anharmonicity and thus limit the efficiency.

In the present invention, the laser energy is applied to a gaseous volume of absorbing molecules in the form of two or more pulses, with the interval between pulses chosen to maximize the energy absorption. By distributing a fixed amount of available laser energy into time-separated pulses, rotational relaxation, i.e., repopulation of laser-depleted rotational states by molecular collisions, can occur in the interim. The degree of rotational relaxation depends on the laser pulse time separation, the rotational relaxation cross section, the gas pressure, and the pressure of any foreign gas present. The degree of rotational relaxation that takes place between laser pulses may, therefore, be adjusted to maximize the energy absorption rate for a particular incident laser energy. The interval between pulses is optimized by allowing time for rotational but not for vibrational relaxation. The optimal interval depends on the molecular species and, to first order, is inversely proportional to the operating gas pressure.

Isotope separation is one of the processes that can be accomplished by the present invention. If the material being excited includes molecules comprising at least two isotopes of an element, then the first infrared wavelength may be chosen to preferentially excite molecules containing the desired isotope. Subsequent exposure to the second infrared wavelength excites these previously-excited molecules, with some additional isotopic specificity, to a state at which they undergo a chemical reaction. The reaction product, enriched in the desired isotope, is then separated from the remainder of the material by conventional chemical or physical means, well known in the art.

The molecules suitable for excitation by the method of the present invention are those polyatomic molecules that can be excited by MPE. These include $SF_6$, $BCl_3$, $D_2CO$ and hydrofluorocarbons. As used in this specification and the appended claims, hydrofluorocarbons denote compounds which include at least one atom each of hydrogen, fluorine and carbon and optionally contain one or more atoms of chlorine or bromine. Aliphatic hydrofluorocarbons having two or fewer carbon atoms are preferred. Examples of suitable hydrofluorocarbons and their refrigerant numbers are:

| | |
|---|---|
| $CHCl_2F$ | 21 |
| $CHClF_2$ | 22 |
| $CHF_3$ | 23 |
| $CH_2F_2$ | 32 |
| $CH_2ClF$ | 31 | and either or any of the isomers of:

| | |
|---|---|
| $C_2HCl_2F_3$ | 123 |
| $C_2HClF_4$ | 124 |
| $C_2HF_5$ | 125 |
| $C_2H_2F_4$ | 134 |
| $C_2H_2ClF_3$ | 133 |
| $C_2H_3F_3$ | 143 |
| $C_2H_4F_2$ | 152 |

Among these hydrofluorocarbons, for isotope separation those of the formula $HCF_2X$, wherein X is F, $CF_3$, $CHF_2$, $CH_2F$ or $CH_3$, are more preferred, with trifluoromethane (TFM) most preferred.

Optionally, the material being exposed to radiation may include a second (or "buffer") gas in order to enhance the rate of rotational relaxation relative to vibrational relaxation. (Both rates are increased, but the rotational more than the vibrational) If the difference between these relaxation times is seen as providing a time "window" for the second pulse to enter, then the buffer gas "opens the window." Gases suitable for this purpose must neither react with the molecules prior to MPE nor absorb the incident radiation to any significant degree. High rotational relaxation cross section is also desirable. Among suitable gases are noble gases and stable diatomic and triatomic molecules (e.g., $N_2$, $O_2$, Co and $NO_2$). Noble gases are generally preferred, because they are non-reactive.

Excitation of the molecules is accomplished by at least one infrared laser. Conventional infrared sources do not provide adequate fluence. The first infrared wavelength is selected to correspond approximately to the $v=0$ to $v=1$ absorption energy of the molecule. The second infrared wavelength may be the same as the first; preferably, the second wavelength corresponds approximately to the $v=1$ to $v=2$ absorption energy of the molecule.

Mode-locked or Q-switched operation of the laser is particularly advantageous. In mode locked operation, a train of pulses is provided at a frequency equal to the natural spacing of the laser resonator modes and with a pulsewidth approximately equal to the universe of the laser's natural linewidth. Ideally the time interval between pulses corresponds to the relaxation time of the gas molecules; but, unless the laser cavity is quite long, relaxation of the molecules at low pressure is generally too slow. To hasten relaxation, the pressure is increased or a buffer gas is added. The latter is generally preferred, because high gas pressure can cause absorption to be concentrated in the top layer of the gas and/or cause dielectric breakdown. Similar results can be achieved with Q-switched operation.

In general, temperature is not critical in the practice of this invention, and operation at ambient temperature is thus suitable as well as convenient.

Suitable pressures at which this invention may be practiced depend on the fluence. In general, the methods of this invention are practiced at pressures below atmospheric pressure, preferably at pressures below about 1 kPa. However, higher pressure operation is feasible at somewhat higher fluence. The minimum fluence required is determined by the pressure-dependent collisional quenching of MPE. The maximum fluence is limited by dielectric breakdown.

Figure 2:
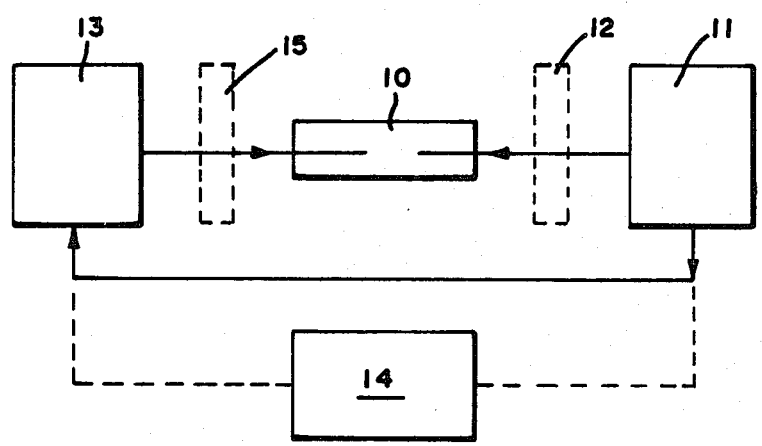
FIG. 2 is a schematic illustration of an apparatus suitable for practicing this invention.

FIG. 2 is a schematic of an apparatus suitable for the practice of the present invention. The material to be exposed is contained in a cell 10. A first infrared laser beam from laser 11 passes through (optional) optical system 12 and irradiates material in cell 10. Laser 11 also provides a synchronized output signal that triggers a second infrared laser 13. The signal is subjected to a variable time delay by pulse-delay generator 14. The radiation from laser 13 passes through (optional) optical system 15 and irradiates the material in cell 10.

Figure 3:
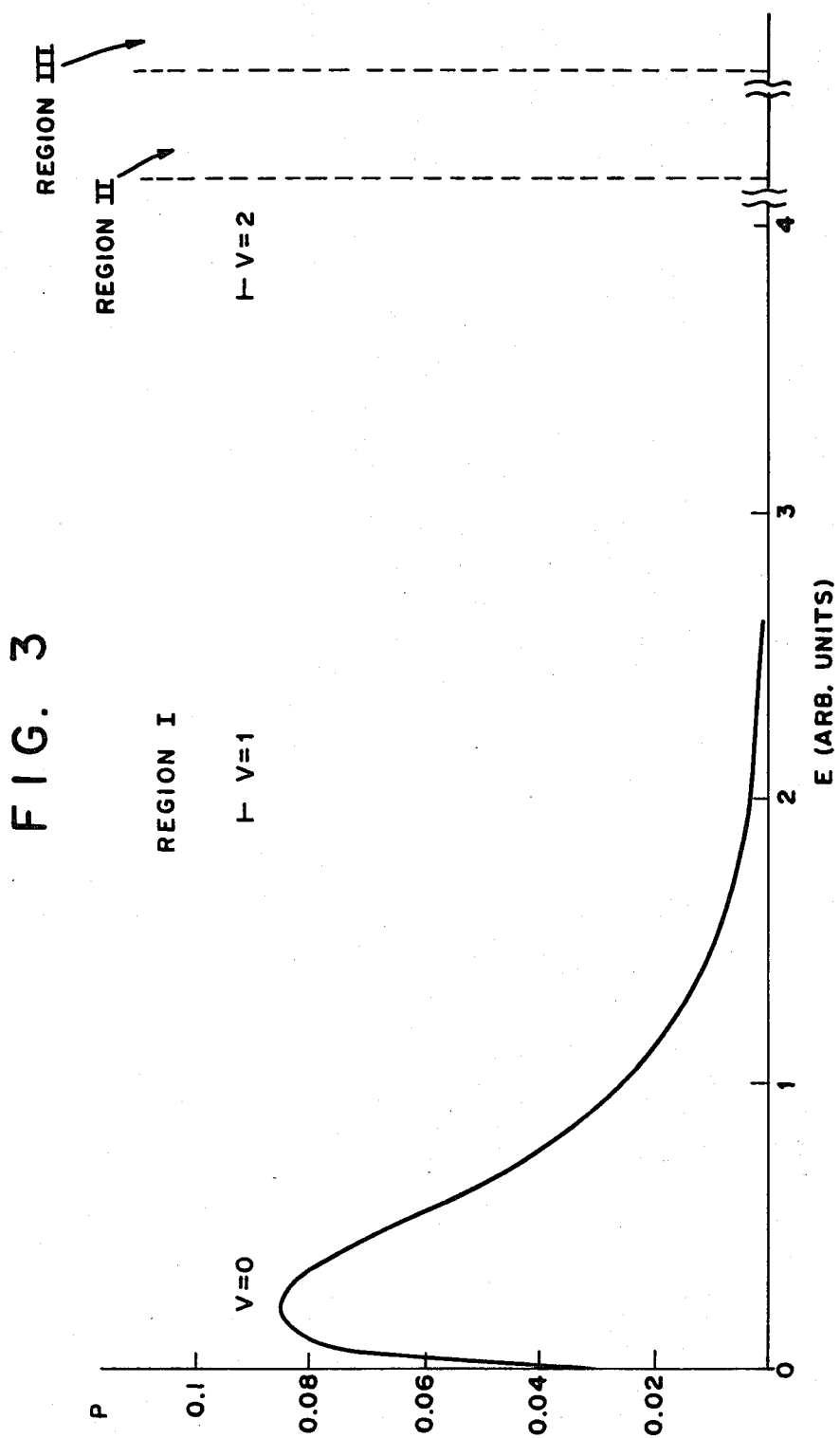
FIG. 3 is a schematic diagram that depicts the concentration of molecules in various rotational states of low-lying vibrational states prior to excitation.

FIGS. 3, 4, 5 and 6 depict the concentration of molecules in various rotational states of low-lying vibrational states at four successive times during the process of the present invention. FIG. 3 shows, for a typical molecule, the rovibrational state occupation probability, P, as a function of energy, E, before the first excitation.

Figure 4:
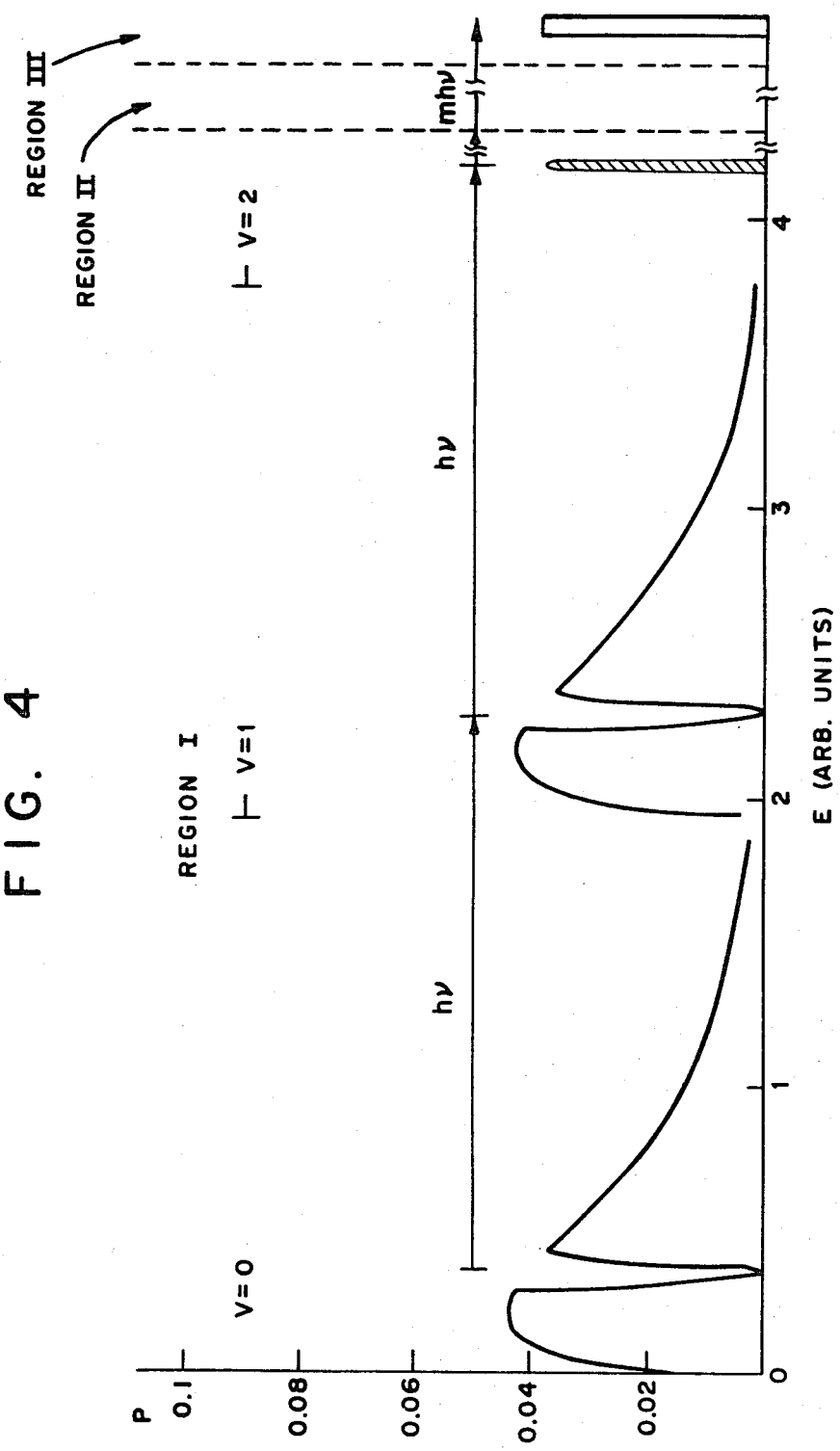
FIG. 4 depicts the diagram of FIG. 3 after excitation with the first infrared laser pulse.

FIG. 4 shows the "holes" in the distribution of occupied states caused by the excitation. To the extent that these holes deplete the concentration of molecules in a rotational state that are available for subsequent excitation, the excitation efficiency is reduced. The hatched peak at the $v=2$ level represents the $v=2$ rovibrational state that was accessible with the particular photon energy used. The state is quickly emptied as the molecule is excited to the continuum (Region III).

Figure 5:
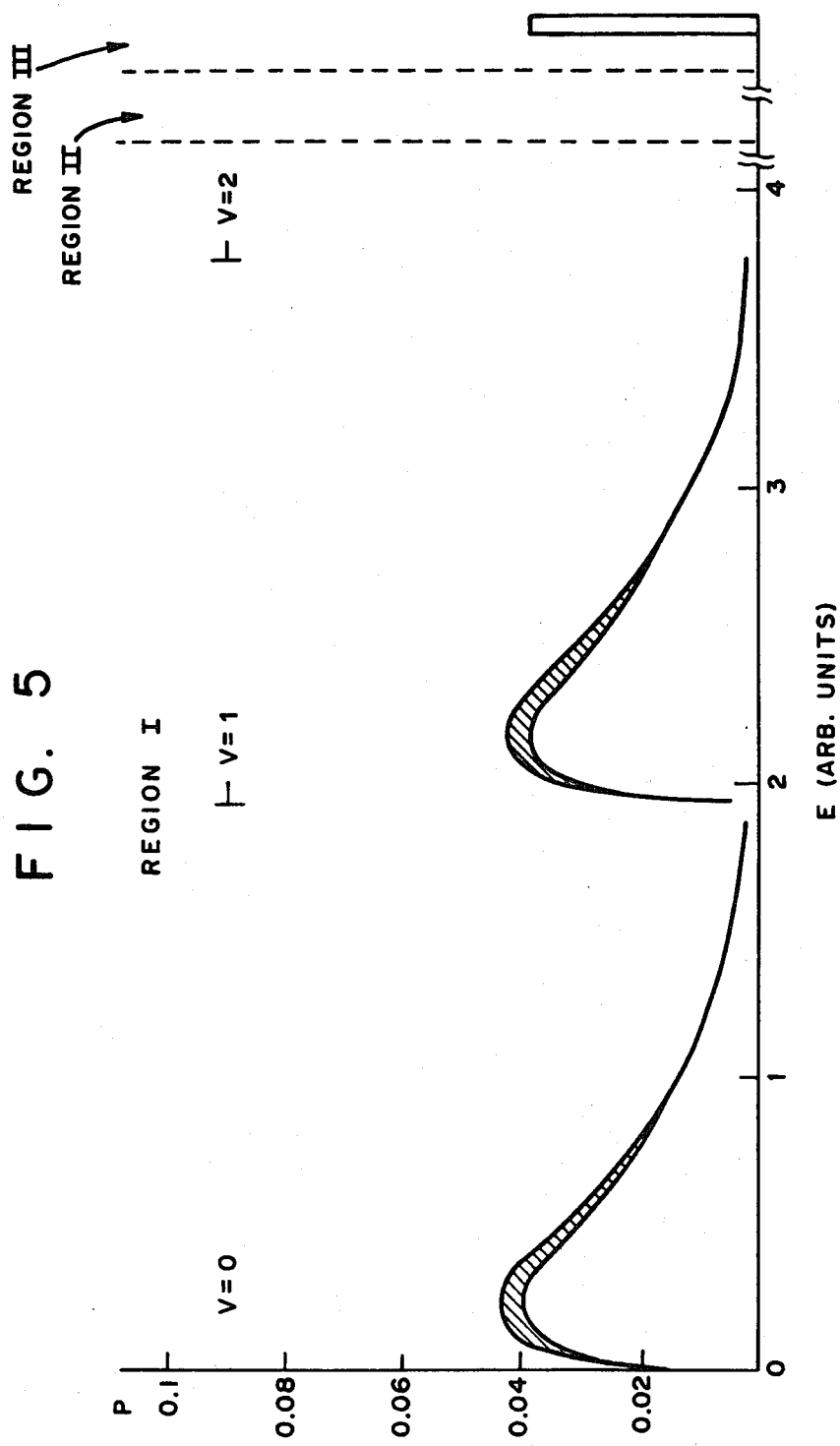
FIG. 5 depicts the diagram of FIG. 4 after a delay that is intermediate in time between the rotational and vibrational relaxation times of the molecule.

After the first excitation, there is preferably a delay of duration intermediate between the rotational and vibrational relaxation times. FIG. 5 shows the concentration of molecules in various rotational states after that delay, when the material is about to be exposed to the second infrared radiation. Rotational relaxation has to some extent filled the holes in the distribution of FIG. 4; however, no significant vibrational relaxation has taken place. The hatched areas in the $v=0$ and $v=1$ distributions represent the reduction in occupation of adjoining states resulting from the filling of the holes.

Figure 6:
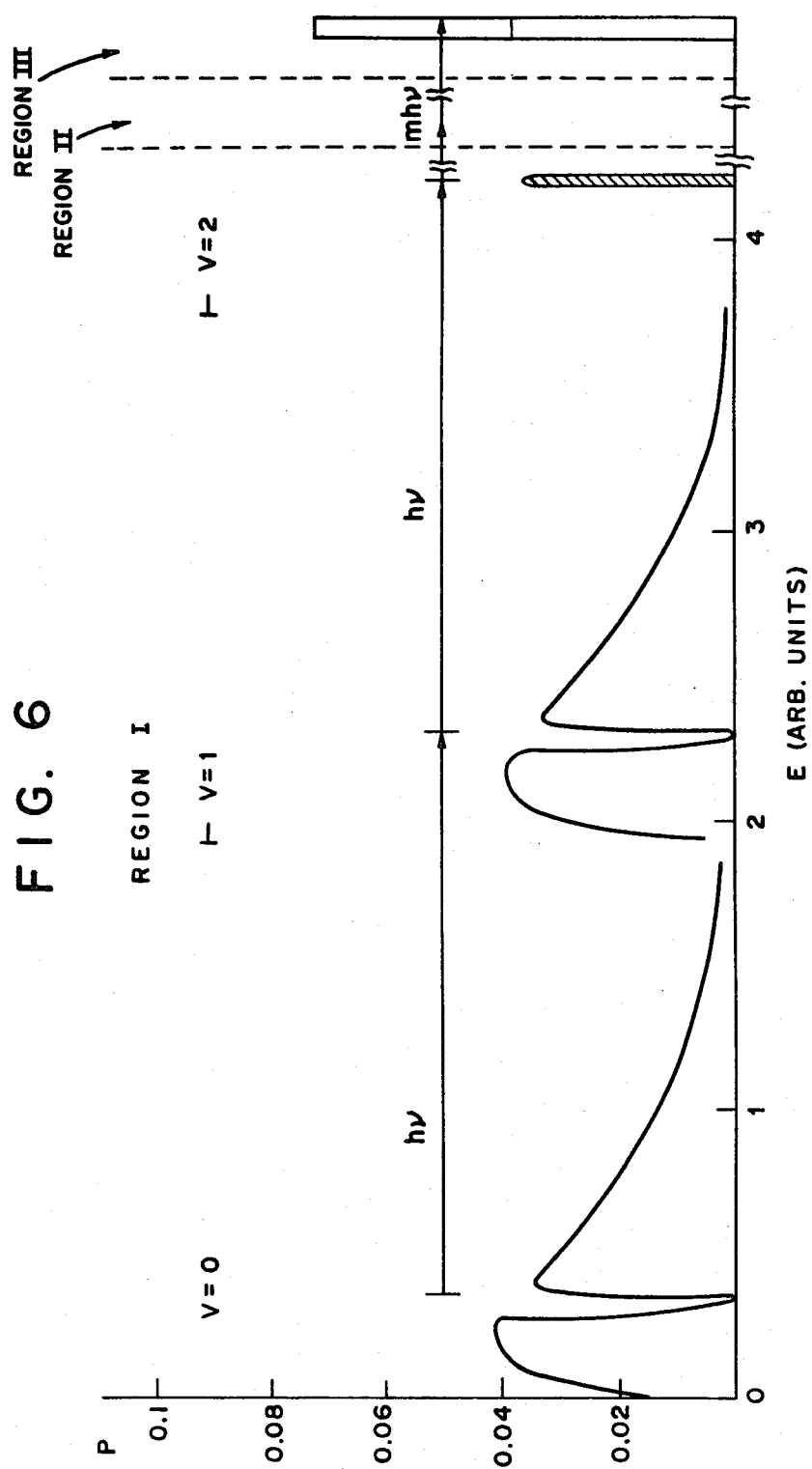
FIG. 6 depicts the diagram of FIG. 5 at the onset of the chemical reaction that results from the sequential excitations.

Finally, after exposure to the second infrared radiation, additional molecules are excited to Region III, where they undergo a chemical reaction. The concentration of molecules at that time is shown in FIG. 6.

When the gas comprises more than one isotope of an element, the excitations depicted in FIGS. 3–6 may be isotope-selective, because of isotopic shifting of the excited vibrational states. Thus, isotope enrichment and separation may be achieved by another embodiment of the present invention. This method involves first exciting a material of polyatomic molecules isotope-selectively with infrared radiation of a first wavelength. The excited molecules, which contain the particular isotope, are then excited by infrared radiation of a second wavelength and undergo a chemical reaction. The reaction product, enriched in the particular isotope, is then separated from the remainder of the material by conventional chemical or physical means.

Figure 7:
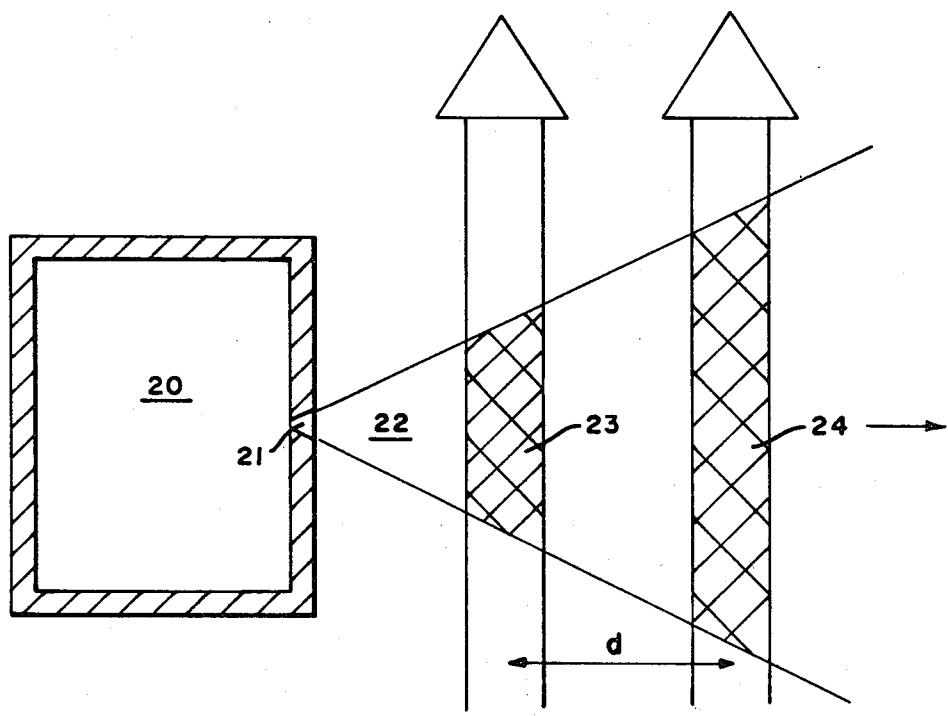
FIG. 7 is a schematic of another apparatus suitable for practicing this invention.

A particular apparatus and method that are suitable for isotope separation may be understood by reference to FIG. 7. The apparatus shown there includes a molecular beam source chamber 20, having a nozzle 21, through which the molecular beam 22 expands and cools. Beam 22 passes successively through the areas 23 and 24 irradiated by the output from two lasers (not shown) or from a single laser whose output has been split. The areas are separated by a distance d; thus, successive irradiation of a molecule traveling normal to the laser beams at a velocity v occurs with a time interval, t, between exposures given by $t=d/v$. The points of intersection of the laser beam with the molecular beam are chosen to optimize the dissociation efficiency of the desired isotope since the molecule's internal temperature and the number of collisions per unit time in the beam vary with the distance downstream from the nozzle. After the exposures, the molecular beam passes to a conventional chemical separation means (not shown). Uranium isotope separation can be accomplished using the apparatus of FIG. 7, with 16 $\mu$m laser irradiation followed by $CO_2$ laser irradiation.

The following examples are presented in order to provide a more complete understanding of the invention. The specific techniques, conditions, materials, and reported data set forth to illustrate the principles and practice of the invention are exemplary and should not be construed as limiting the scope of the invention.

EXAMPLE 1

A cylindrical glass sample cell fitted with NaCl windows to transmit infrared radiation was filled with a gaseous mixture consisting of a known partial pressure of $CF_3D$ or of $CF_3H$ and a known partial pressure of inert gas (usually Ar).

Laser beams from two different $CO_2$ lasers (manufactured by Tachisto Inc. and Lumonics Research) were made to travel along the same optical path (parallel to the long axis of the cell) by geometry similar to that shown in FIG. 2. The frequency of each laser beam could be independently varied over the 9.6 $\mu$m and 10.6 $\mu$m $CO_2$ laser bands. The intensity of each laser beam could be independently varied by the insertion of $CaF_2$ attenuators into each laser beam path. The time delay between laser pulses could be varied from overlapping (zero delay) to long delays (>1 sec) by electronically delaying the trigger pulses to each laser. Throughout the experiment laser parameters were monitored by using a $CO_2$ spectrum analyzer, infrared power meters and a photon drag detector and oscilloscope to make wavelength, power and time delay measurements, respectively.

The laser beams were focused into a region near the center of the cell by a 180 mm focal length NaCl lens placed just in front of the entrance window to the gas filled sample cell. The beams exited through another NaCl window on the opposite side of the cell. A cooled InSb infrared detector mounted perpendicular to the cell's major axis viewed the central region of the cell through a third NaCl window mounted at mid cell. A narrow pass infrared filter designed to pass DF or HF vibrational fluorescence near 3.3 $\mu$m and 2.5 $\mu$m respectively was used to shield the detector from unwanted radiation.

Figure 8:
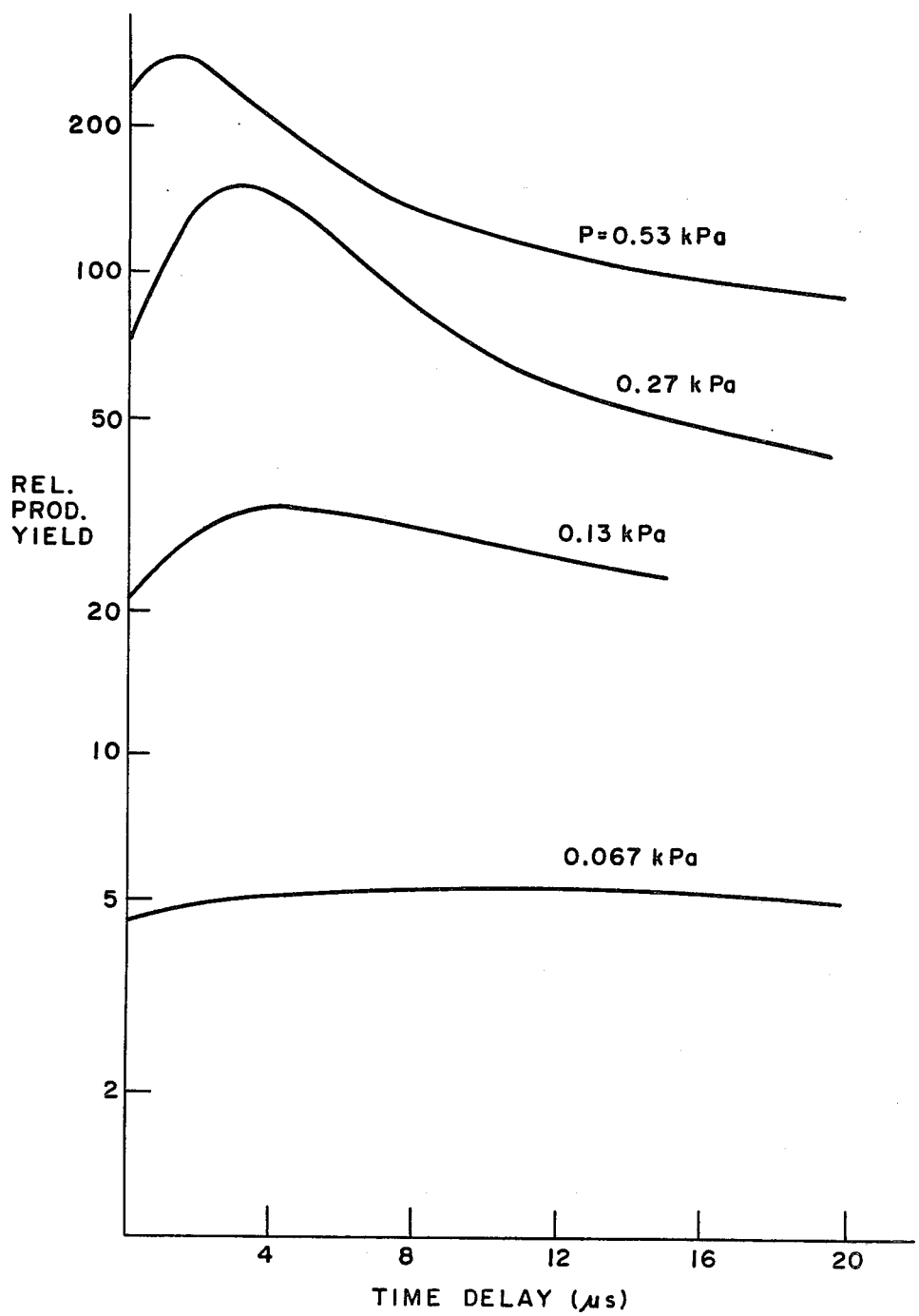
FIG. 8 depicts results achieved using the method of the present invention with trifluoromethane.

During operation the $CO_2$ TEA laser output was controlled by attenuators. Typical pulse energies of 170 mJ in each laser beam (340 mJ total energy) were used. The multiphoton dissociation yield (number of $CF_3D$ molecules dissociated to give $CF_2+DF$) was monitored by recording the DF infrared vibrational emission which followed each laser pulse sequence. Previous studies have shown that this IR emission intensity accurately follows the IR multiphoton dissociation (MPD). Typical data for the MPD-produced fluorescent emission as a function of the time delay between laser pulses is given in FIG. 8 for pure $CF_3D$ samples at various pressures. That figure shows that for pressures of about 0.27 kPa a factor of two enhancement occurs for pulse delays of 3 μs over the case in which all laser energy comes in a single pulse (zero delay).

EXAMPLE 2

Figure 9:
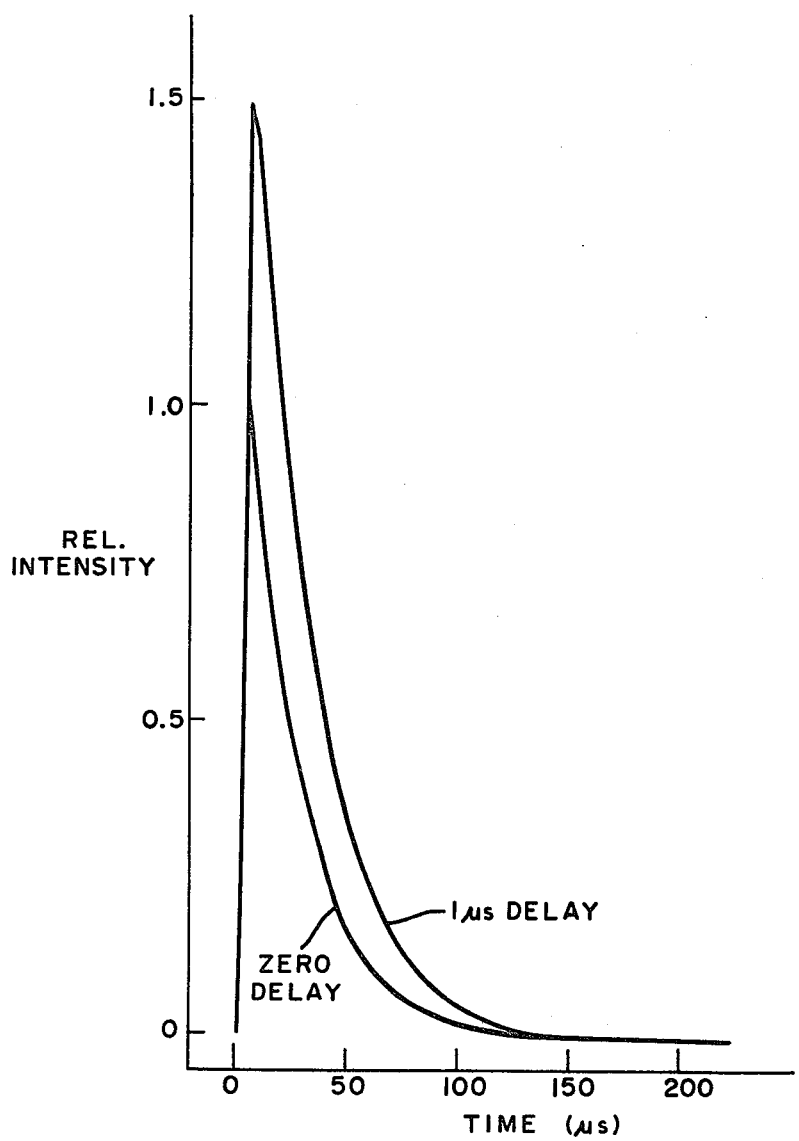
FIG. 9 depicts results achieved using the method of the present invention with vinyl fluoride.

Experiments using the same apparatus as in Example 1 were performed in which the sample consisted of CH$_2$CHF. The recorded product fluorescence intensity vs. time is displayed in FIG. 9 for the cases of overlapping pulses (zero delay) and pulses separated by 1 μs. The pressure was 0.27 kPa. Again, the enhancement for time-separated pulses is apparent.

We claim:

1. A multiphoton excitation method comprising the sequential steps of:
   (a) exposing a gaseous material comprising polyatomic molecules to infrared laser radiation of a first predetermined wavelength to excite the polyatomic molecules to excited vibrational states of the ground electronic state and
   (b) after a time delay that is shorter than the vibrational but longer than the rotational relaxation time of the polyatomic molecule, exposing the material to infrared laser radiation of a second predetermined wavelength to further excite the molecules to produce a state at which the excited molecules undergo a chemical reaction.

2. An isotope enrichment and separation method comprising the sequential steps of:
   (a) exposing a gaseous material of polyatomic molecules comprising a particular isotope of an element and at least one other isotope of the same element to infrared laser radiation of a first predetermined wavelength to preferentially excite the polyatomic molecules containing the particular isotope of the element to excited vibrational states of the ground electronic state,
   (b) after a time delay that is shorter than the vibrational but longer than the rotational relaxation time of the polyatomic molecule, exposing the material to infrared laser radiation of a second predetermined wavelength whereby the excited molecules, enriched in the particular isotope, are further excited to produce a state at which the excited molecules undergo a chemical reaction, and
   (c) separating the resultant reaction product, enriched in the particular isotope, from the remainder of the material.

3. The process of claim 2 in which the material is a hydrofluorocarbon of the formula HCF$_2$X, wherein X is F, CF$_3$, CHF$_2$, CH$_2$F, or CH$_3$.

4. The process of claim 3 in which the material is trifluoromethane.

5. The process of claim 2 in which the material is expanded through a nozzle to form a molecular beam, and exposure to the first and second predetermined wavelengths is effected at spaced-apart points along the beam path.

6. The process of claim 5 in which the material comprises UF$_6$.

7. The process of claim 1 or 2 in which the first and second predetermined wavelengths are substantially equal.

8. The process of claim 1 or 2 in which the first predetermined wavelength is selected to have a photon energy approximately corresponding to the energy difference between the ground and first excited vibrational states of the molecule and the second predetermined wavelength is selected to have a photon energy approximately corresponding to the difference between the first and second excited vibrational states of the molecule.

9. The process of claim 1 or 2 in which the material is selected from a group consisting of SF$_6$, BCl$_3$, D$_2$CO$_3$, and gaseous aliphatic hydrofluorocarbons having two or fewer carbon atoms.

10. The process of claim 1 or 2 in which the material further comprises a gas selected from a group consisting of N$_2$, O$_2$, CO, NO$_2$, and the noble gases.

* * * * *